United States Patent [19]
Wolcott

[11] 3,924,476
[45] Dec. 9, 1975

[54] DRIVING GEAR AND FEEDING MECHANISM
[76] Inventor: Robert M. Wolcott, 750 W. Christie, Banning, Calif. 92220
[22] Filed: Feb. 25, 1974
[21] Appl. No.: 445,097

[52] U.S. Cl. ................................................. 74/30
[51] Int. Cl.² ...................................... F16H 9/04
[58] Field of Search ........................... 74/30, 31, 76

[56] References Cited
UNITED STATES PATENTS

| | | | |
|---|---|---|---|
| 145,599 | 12/1873 | Taylor | 74/30 |
| 1,398,392 | 11/1921 | Reuter | 74/30 |
| 2,515,174 | 7/1950 | Abrams | 74/30 |

Primary Examiner—Samuel Scott
Assistant Examiner—Wesley S. Ratliff, Jr.
Attorney, Agent, or Firm—Robert C. Comstock

[57] ABSTRACT

Oscillatable driving means loosely mounted for shifting in a to-and-fro motion with partial restraint by pivot means, the driving means having two opposed sets of driving teeth, the first set of which is urged into driving engagement with a driven rotary member to rotate the latter forwardly during movement of the driving means in a first direction of movement and the second set of which is moved into driving engagement with the teeth of the rotary member to continue forward rotation of the latter during the return movement of the driving means in a second direction, the teeth of the driving and driven means being of a shape which permits camming and ratcheting.

2 Claims, 15 Drawing Figures

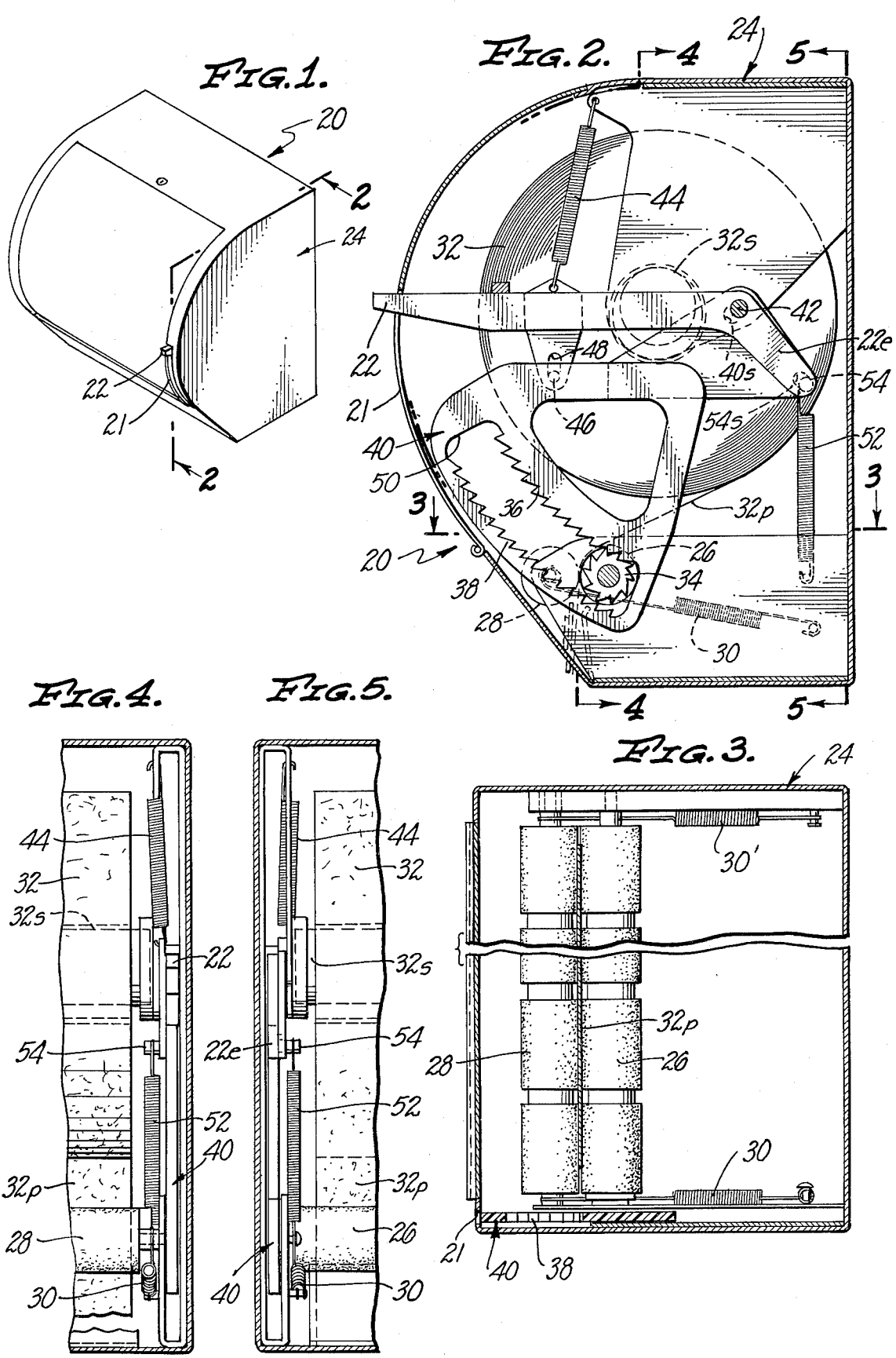

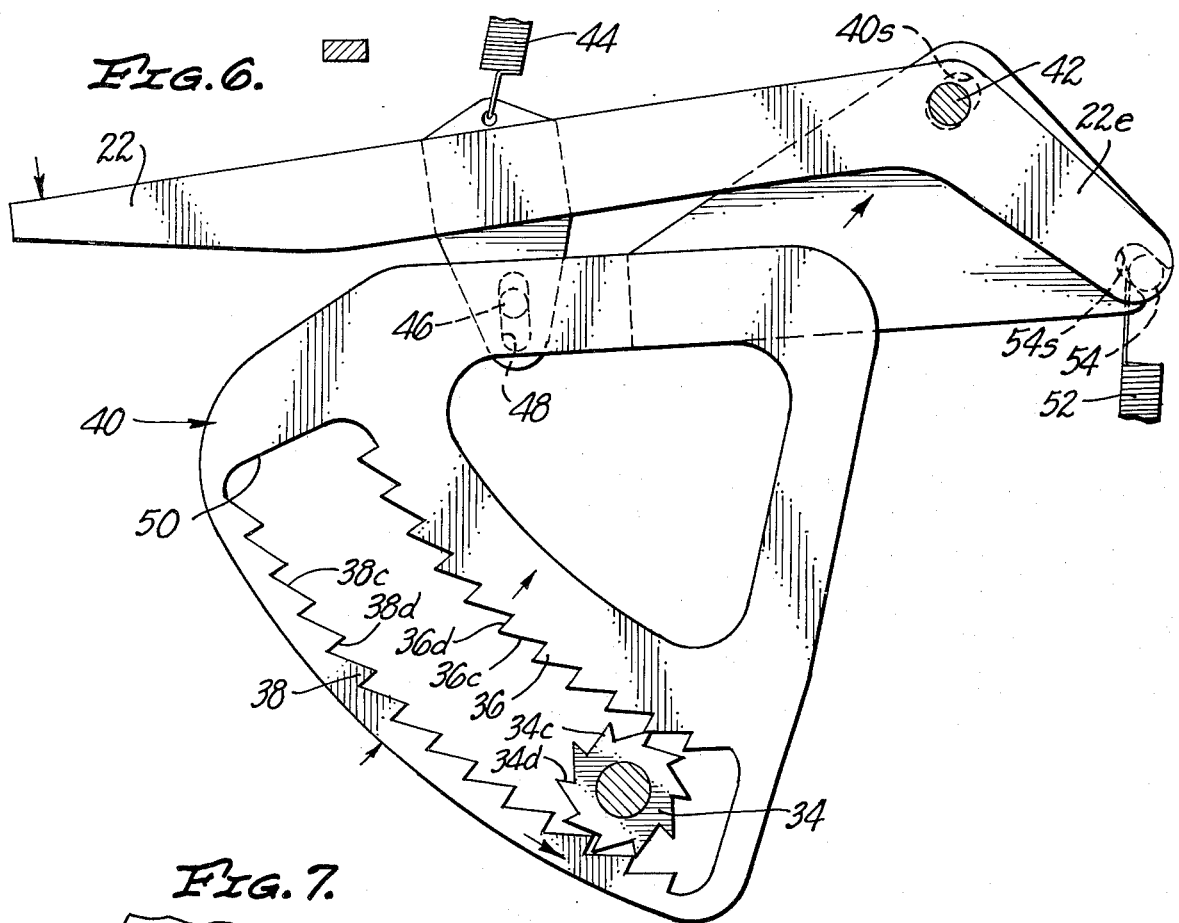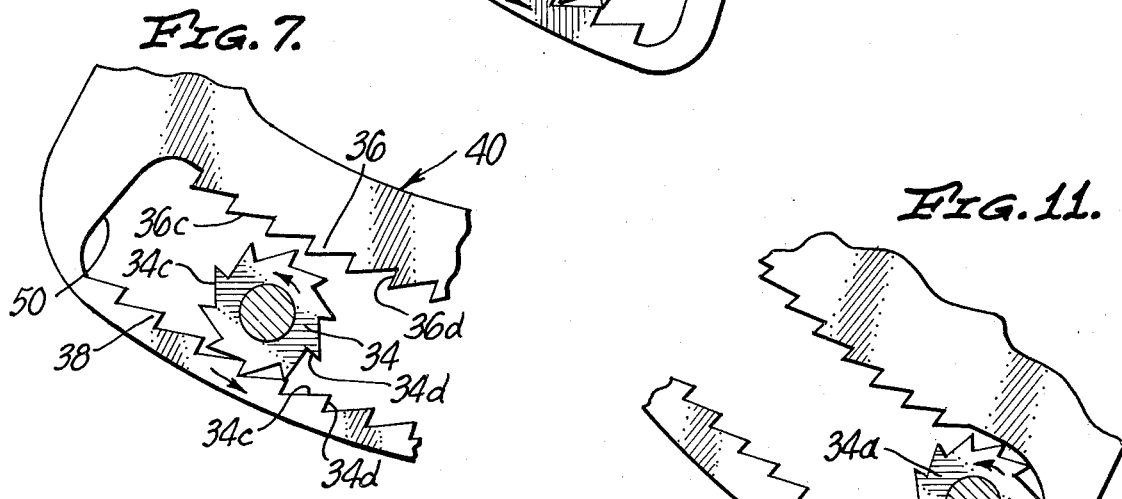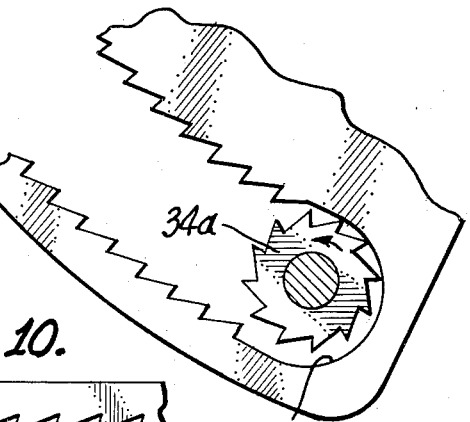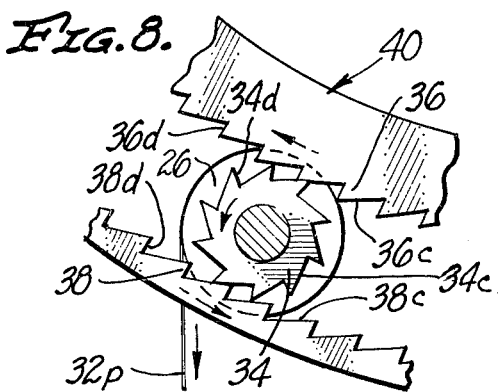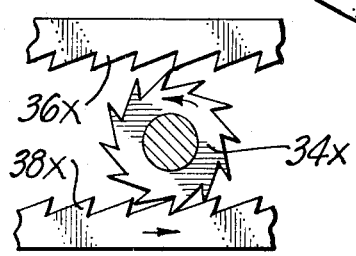

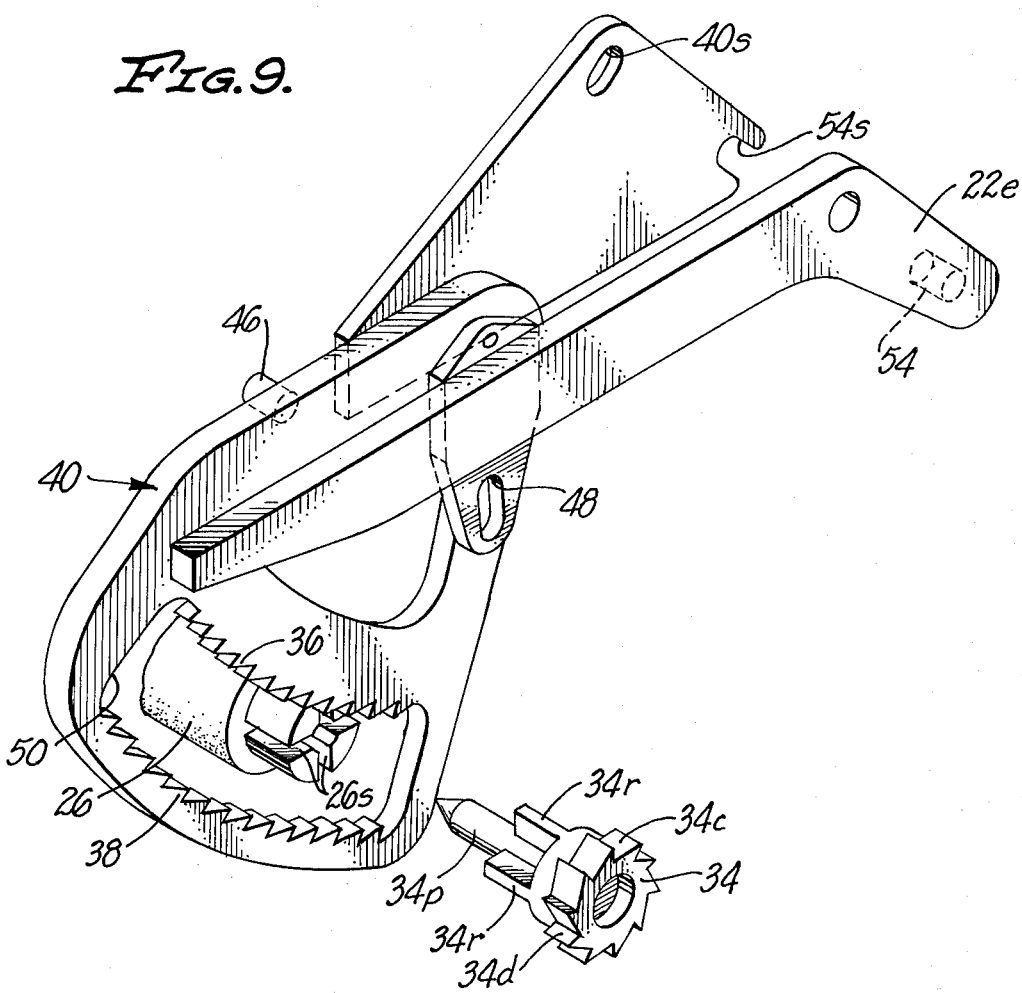
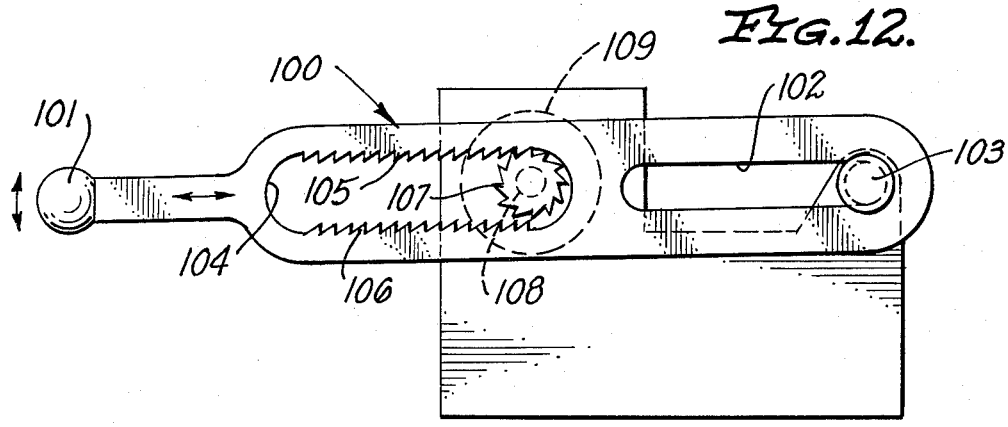

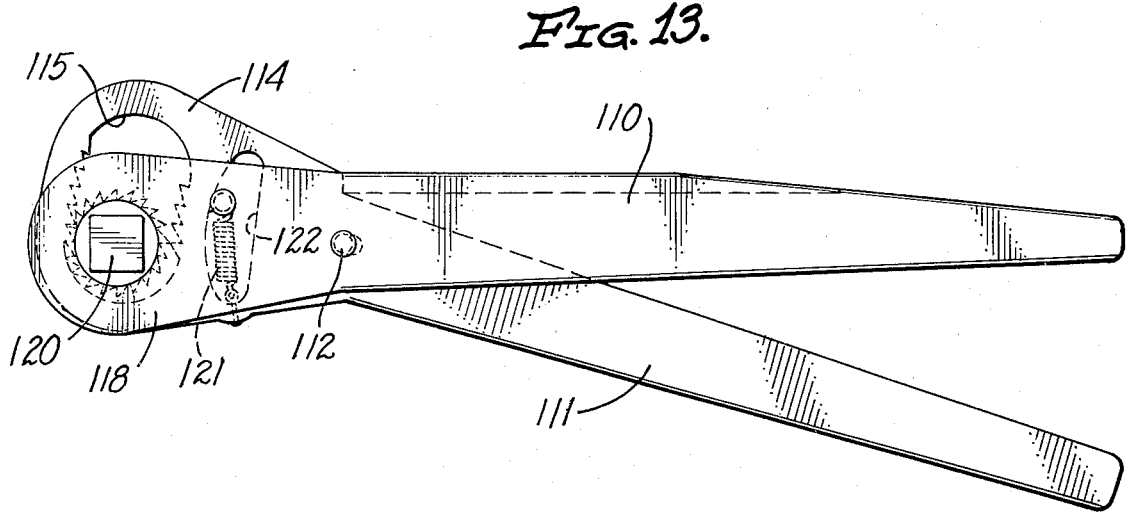
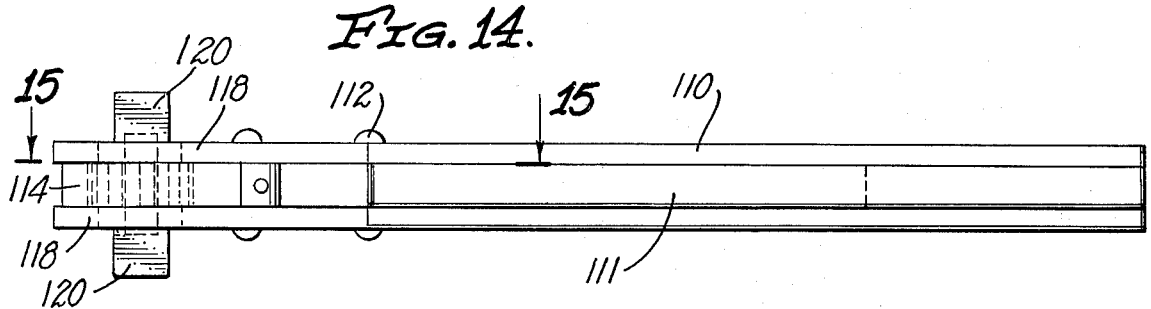
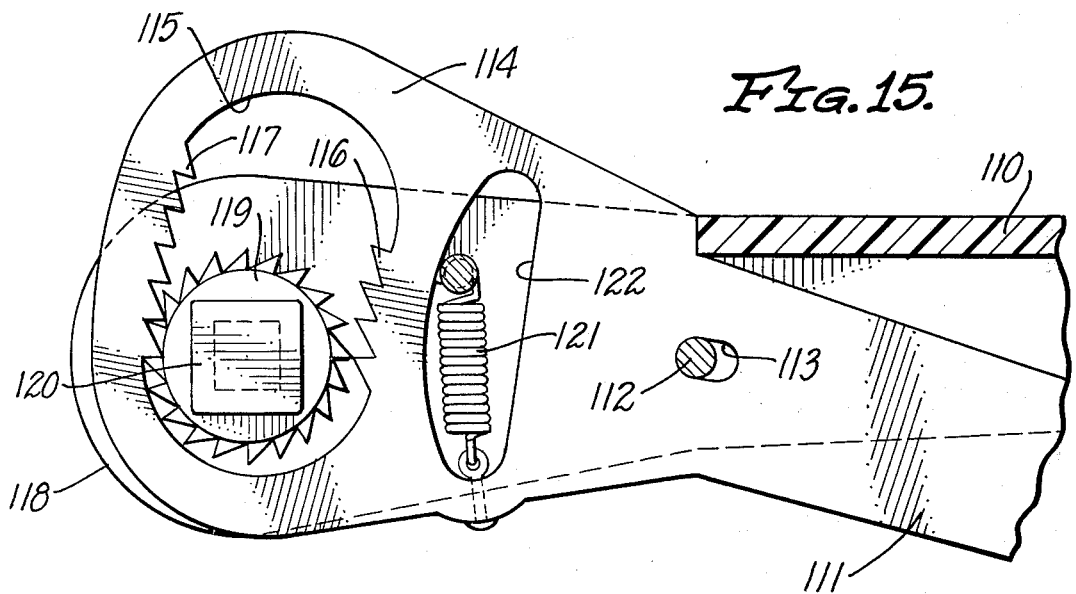

DRIVING GEAR AND FEEDING MECHANISM

BACKGROUND OF THE INVENTION

1. Field of the Invention

A driving gear and feeding mechanism which is adapted for use in a paper towel dispenser and in various other machines and various other devices and applications.

2. Description of the Prior Art

The previously known mechanisms adapted to convert a to-and-fro movement of an actuator into unidirectional rotational movement of a rotary member such as a shaft have been complicated and/or of short operational lifetime due to having numerous parts including parts subject to rapid wear and/or breakage. Further, such mechanisms have generally been restricted to uniform strokelength of the actuator and/or the necessity for auxiliary means such as clutch means or the like for permitting variable driving stroke length. Typical of such prior art mechanisms is that disclosed in U.S. Pat. No. 3,606,125.

SUMMARY OF THE INVENTION

By provision of unique means, the present invention obviates the undesirable features of prior art mechanisms and, concurrently with the provision of only a few strong longlife parts, permits utilization of drive strokes of any length between a very short minimum and a very long maximum stroke. It also permits the mixing of driving strokes of any length, with power being transmitted from the driving member to the driven member during substantially the entire length of each stroke.

A driving member, which may comprise several parts or a single piece, is provided with a first elongated set of forwardly directed driving teeth and a second elongated set of reversely directed driving teeth. A rotary driven member has an arcuate set of teeth complementary to those of the driving member. The driving member is movable to a first driving attitude, wherein the teeth of its first set are in driving engagement with the rotary driven member for driving operation of the driven member during a stroke or movement in a first direction (herein termed a forward direction as a matter of convenience). The driving member is also movable to a second driving attitude wherein the teeth of its second set are in driving engagement with the rotary driven member for driving operation of the driven member in the same direction as previously, during movement of the driving member in a second and generally opposite reverse or return stroke of the driving member.

Change of driving attitude of the driving member can be manually effected or be made automatically, as by operation of means such as spring means which urge the driving member to one or the other driving attitude. Rotary movement thus imparted to the driven member during to-and-fro movement of the driving member can be made to be continuous, as by securing inertia means or like means to the driven member, or may be made to be intermittent and occur only during power-transmitting movement of the driving member. The motion of the driving member is to-and-fro, being alternatively of a rocking motion of substantially reciprocatory.

In an exemplary embodiment, as applied to a web-feeding apparatus and as herein described in detail, the driving member, which hereinafter may be termed the driver in the interest of brevity, is mounted so as to be operable in a modified arcuate or rocking type of motion. In that specific embodiment of the invention, the driver rocks about a pivot but moves to different radial positions relative to the pivot in moving from one driving attitude to the other, and the driver is actuated by a pivoted manually operated lever to which it is connected.

Various modifications of the basic structure comprising the invention are readily effected, and are of value in specific application of the basic concept. As an example, the arrangement and shape or configuration of the parts may be such as to permit locking of the driver member relative to the driver and the driver may be so made that driving engagement may selectively be chosen to occur in only one direction of movement of the driver, or both. As will be herein made evident, the shapes of co-acting teeth of the driver and of rotary driven member are such as to enhance engagement in the driving direction and to inhibit effective engagement in the wrong direction. Thus, the teeth of both members may be sawtooth or ratchet and spur gear form.

As the rotary driven member is driven in only one direction, only one driving face on each tooth is required leaving the other face of each tooth usable as a cam for shifting the driver when its direction is changed. In a towel dispenser, the cam faces may be used to effectively lock the driven member against rotation if the user attempts to deliver excessive toweling by pulling on the exposed towel, as will be subsequently described. For longer wear, the drive faces preferably have the shape of a spur gear drive face. For simplicity or in other cases, they may have other shapes. A simple saw tooth shape is shown in the drawings for purposes of illustration.

The preceding general summary of the invention makes it evident that it is a principal object of the invention to provide general improvements in mechanism of the type above-mentioned. It is another object of the invention to provide a simple and inexpensive mechanism for converting to-and-fro strokes of a driver to unidirectional rotational movement of a driver member. A more restricted object is to provide a simple mechanism for selectively converting either or both of to-and-fro strokes of a driving member to unidirectional rotational movement of a driven member.

Another object is to provide a simple mechanism for converting to-and-fro motion of a driving member into unidirectional rotation of a driven member with provision for selection of either type of operation from among full length of driver stroke driving in either or both of to-and-fro driver strokes, and selection of full or partial stroke length driving in either or both directions of the to-and-fro movements.

Other objects and advantages of the invention are hereinafter set out or made evident in the following detailed description of an exemplary embodiment incorporated in a sheet material feeding device and as illustrated in the accompanying drawings.

DESCRIPTION OF THE DRAWINGS

FIG. 1 is a reduced isometric view of a sheet dispensing device incorporating the novel mechanism of the invention;

FIG. 2 is a sectional view taken on line 2—2 of FIG. 1;

FIG. 3 is a sectional view taken on line 3—3 of FIG. 2;

FIG. 4 is a sectional view taken on line 4—4 of FIG. 2;

FIG. 5 is a sectional view taken on line 5—5 of FIG. 2;

FIG. 6 is a fragmentary enlarged view in elevation of the driving mechanism assembly incorporated in the device depicted in FIG. 1;

FIG. 7 is a fragmentary view showing the operational relationship between the driving and driven members of the mechanism shown in FIG. 6 during a first to-and-fro movement of the driving member;

FIG. 8 is a fragmentary view similar to FIG. 7, showing the locked position of the mechanism;

FIG. 9 is an exploded isometric view of the three basic parts of the drive mechanism as incorporated in a towel dispenser;

FIG. 10 is a view similar to FIG. 7, showing a modified form of teeth which are undercut, for special applications;

FIG. 11 is a fragmentary view showing a modified actuator which allows the wheel to turn free at the end of the stroke;

FIG. 12 is an elevational view of a simplified alternative embodiment on the invention, in which the actuator has straight sets of teeth which are manually operated and shifted in both directions;

FIG. 13 is a side elevational view of a wrench constructed in accordance with the present invention;

FIG. 14 is a top plan view of the same;

FIG. 15 is a side elevational view similar to FIG. 13 taken along line 15—15 of FIG. 14.

DESCRIPTION OF THE PREFERRED EMBODIMENT

In FIG. 1 there is shown a pictorial representation, to reduced scale, of a device 20 embodying an exemplary form of the invention, the device being a paper towel dispenser in which a supply roll of toweling is supported for rotation and from which a sheet is drawn by roll means and advanced through an opening to the exterior of the device for detachment and use. While the dispenser is an illustrative environment for the invention, the invention is not limited to that specific application and is, as will be made evident, widely useful in a variety of machines and devices.

The roll means includes a pressure roller and a driven roller, between which the sheet is gripped, the driven roller being effective to draw paper from the supply roll and to determine the length of paper drawn and passed through the opening. The driven roller and the pressure roller are rotatably mounted in frame means or other fixed structure, in this instance in the housing 24 of the dispenser. The invention is encompassed in the means for unidirectionally rotating the driven roller or equivalent rotary means, incident to to-and-fro oscillation of an actuating means.

In the device 20, the actuating means is driven by a lever 22 which protrudes from the housing 24 through a slot or opening 21, along which the lever travels in to-and-fro movements.

The driving mechanism is shown in FIGS. 2-5. Therein a driven roller 26 is supported for rotation in fixed bearings in the housing 24, as indicated. A pressure roller 28 has its shaft ends seated in guide slots in the housing 24 and is drawn into pressing engagement with the paper and driven roller 26 by a pair of tension springs 30, 30', one end of each of which springs is anchored to the housing 24 as indicated in FIG. 3, the other end being hooked around respective ends of the shaft of pressure roller 28 as indicated.

A paper supply roll 32 is loosely supported on a shaft 32s whose ends are held captive in recesses in the frame of the housing 24 and the shaft may be of the telescoping spring-stressed type commonly used in mounting rolls of paper. A length 32p of paper extends from the roll 32 downwardly between the noted driven roller 26 and pressure roller 28 and exits from the housing 24 via an elongated slot at the lower front of the housing 24. Rotation of the driven roller 26 thus effectively feeds or delivers paper to an extent determined by the number of revolutions and outside diameter of the driven roller 26.

Driven roller 26 is arranged to be rotated by a toothed wheel 34 fixed on one end of the shaft of the driven roller 26. The wheel 34 has a pin 34p surrounded by four drive ribs 34r which fit within complementary slots 26s in the end of the shaft of the driven roller 26. The teeth of the wheel 34 are engageable by the teeth of either of two opposed series 36 and 38 of complementary teeth formed along respective oppositely directed interior faces of an elongated slot 50 formed in an oscillatable driver or actuator 40.

Each of the teeth of wheel 34 and series 36 and 38 has two faces, one being a radially directed drive face 34d, 36d and 38d and the other being an angularly directed cam face 34c, 36c and 38c. The drive faces are used for moving the members longitudinally with respect to each other, while the cam faces are used for shifting the engagement between the wheel 34 and the teeth 36 and 38. The teeth of the wheel 34 and the teeth of series 36 and 38 automatically cam into 100 percent engagement when the actuator 40 is shifted in either direction with respect to the wheel 34.

The actuator 40 is mounted for to-and-fro oscillation generally about a pin 42 affixed in the housing 24, the actuator 40 having a slot 40s in which the pin 42 is received. Thus, the actuator 40 may be moved downwardly as shown in FIG. 2 to cause engagement of the teeth of series 38 with the teeth of wheel 34 and counter-clockwise rotation (as viewed in FIG. 2) of the wheel 34 and shaft 26. Also, the actuator 40 may be moved upwardly to engage the teeth of series 36 with the wheel 34 and again rotate the wheel and shaft 26 counter-clockwise. Shifting of the actuator 40 inwardly and outwardly relative to the axis defined by pin 42 is made possible by the slot 40s through which the pin 42 extends.

Thus, by simple manual downward movement of actuator 40 followed by upward return movement, the wheel 34 is twice driven in the same direction. The to-and-fro oscillation or movement of the actuator 40 may be variously effected. One suitable means is by simple attachment of a handle to the actuator, in which case some knowledge of the proper directions in which the forces have to be applied is necessary. It is evident that spring means may be used for either of the movements and the other movement effected manually, with concurrent stressing of the spring means. In that way, all of the power required to operate the actuator through a full cycle of to-and-fro movements could be expended during the first movement, with power for the second movement being accumulated and stored in the spring means.

In the dispenser device incorporating the invention and portrayed in FIG. 2, spring means are utilized for storing energy during the first movement (downward) of actuator 40, for return of the actuator upwardly. Such means comprise the previously mentioned manually operable lever 22, the free or forward end of which is arranged to be manually moved downwardly in a first movement, the lever being urged upwardly by a spring 44 connected at its upper end to the housing 24 and at its lower end to the lever 22.

A second coil spring 52 which extends vertically downwardly between a pin 54 carried by an inner angular extension 22e of the lever 22 and the lower portion of the housing 24 may be used to supplement the action of the coil spring 44. The pin 54 is disposed within a slot 54s formed in the actuator 40.

The actuator 40 has a pin 46 at its upper end which is mounted for sliding movement in a vertical slot 48 formed in a flange protruding downwardly from the lever 22.

FIG. 6 of the drawings shows the initial movement of the parts when the lever 22 is first moved downwardly. As the lever 22 is moved downwardly (manually or otherwise), its extension 22e is rotated counter-clockwise, so that slot 54s moves pin 54 counter-clockwise and thereby moves actuator 40 radially inwardly. At the same time, the cam faces 36c of the teeth of the upper or inner series 36 make a camming engagement with the cam faces 34c of the teeth on the upper or inner part of the wheel 34. This camming action also urges the actuator 40 inwardly, with the slot 40s moving inwardly until its lower end engages pin 42, preventing further radial movement of actuator 40. As the actuator 40 moves inwardly, the teeth of the upper series 36 are moved out of engagement with the teeth of the wheel 34 and the teeth of the lower series 38 are moved and cammed into complete engagement with the teeth on the lower or outer part of the wheel 34.

As the lever 22 is moved downwardly, the slot 48 is moved downwardly until its upper end engages the pin 46, forming an engagement between the lever 22 and actuator 40. Further downward movement of the lever 22 accordingly results in simultaneous outward movement of the actuator 40. The lever 22 and actuator 40 may be moved downwardly until the wheel 34 engages the upper end of the slot 50 of actuator 40.

Further downward movement of the lever 22 and actuator 40 causes the teeth 38 to move along the teeth of the wheel 34, moving the slot 50 with respect to the wheel 34 as shown in FIG. 7.

When the wheel 34 is disposed at the upper end of the slot 50, further downward movement is prevented and the lever 22 is then released. Release of the lever 22 permits it to be moved upwardly by the springs 44 and 52.

As the lever 22 is released and moved upwardly by springs 44 and 52, its extension 22e is pivoted clockwise so that its slot 54s engages pin 54 to move actuator 40 radially outwardly. As the actuator 40 moves outwardly, the cam faces 38c of the lower series 38 engage the cam faces 34c of the wheel 34 to provide a camming action which also urges the actuator 40 radially outwardly. The force of gravity may also contribute to the outward movement of the actuator 40.

As the actuator 40 is moved outwardly, the teeth of the wheel 34 move out of engagement with the lower or outer series 38 and into engagement with the teeth of the upper or inner series 36. The cam faces 34c and 36c provide automatic 100 percent engagement of the teeth of wheel 34 and series 36.

As the lever 22 moves upwardly, the bottom of slot 48 engages pin 46, so that further upward movement of lever 22 results in simultaneous upward movement of actuator 40. The lever 22 and actuator 40 are returned to their normal positions as the teeth of the upper series 36 rotate the wheel 34 and the driven member 26 in the same direction in which they were driven by the lower series 38 as the lever 22 and actuator 40 moved downwardly.

It should be noted that shifting of the teeth 36 and 38 with respect to the wheel 34 takes place completely automatically at both ends of the stroke. All that is required is for the lever 22 to be moved downwardly and then released, thereby providing double rotational movement of the wheel 34 in a single direction. The same shifting action takes place with partial strokes as well as full strokes.

If desired, the device may be made so that the wheel 34 is free to rotate or coast at either or both ends of the stroke. This may be achieved in the manner shown in FIG. 11 of the drawings, in which an enlarged area 34e at the end of the slot is toothless and of sufficient size to permit the wheel 34a to move out of engagement with either set of teeth.

In dispensing paper towels, it is sometimes desirable to provide what is termed in the trade an anti-milking action. This requires some means to prevent the user from pulling an unlimited quantity of toweling from the dispenser. With the present invention, such anti-milking action is provided automatically with the structure shown and described if the teeth of the wheel 34 and the two opposed series 36 and 38 are spaced as shown in the drawings. This spacing of the teeth also insures that the teeth 36 and 38 will shift properly at all times.

When the wheel 34 is 100 percent engaged with either set of teeth 36 or 38, the top of the tooth on the opposite side of the wheel 34 will barely pass or clear the teeth of the unengaged set of teeth as the wheel 34 is rotated. (See FIG. 7.) Thus, when the paper 32p is pulled downwardly and the wheel 34 attempts to rotate, the cam faces equalize the spacing of the teeth 36 and 38 about the wheel 34 locking up the mechanism as shown in FIG. 8. This prevent any counter-clockwise rotation of the driven member 26 and prevents any further withdrawal of the paper 32p. It is preferable that the number of teeth on the wheel 34 comprises an even number for the best locking and anti-milking results.

FIG. 10 of the drawings shows an alternative embodiment of the invention in which the teeth of the wheel 34x and the series 36x and 38x are undercut.

FIG. 12 of the drawings shows a simplified alternative embodiment of the invention in which a simple lever 100 has a manually operable handle 101 at one end thereof. The lever 100 has an inner slot 102 which fits around a pin 103 for reciprocal movement and also for limited pivotal movement. A second slot 104 has opposed sets of oppositely directed teeth 105 and 106 which are adapted to alternately engage a rotatable wheel 107 mounted on a shaft 108, which may carry a roll 109.

The handle 101 may be moved inwardly (to the right on FIG. 12), causing the wheel 107 to cam downwardly into engagement with the lower set of teeth 106 for counter-clockwise rotation of the wheel 107. When the end of the stroke is reached, with the wheel 107 disposed at the outer end of the slot 104, outward move ment of the handle 101 will by the automatic camming action of the teeth cause the wheel 107 to engage the upper teeth 105 for further counter-clockwise rotation of the wheel 107. If desired, the handle 101 may be moved up or down at the conclusion of each longitudinal movement in order to facilitate the shifting action.

In subsequent use, the engagement between the teeth of the wheel 107 and the sets of teeth 105 and 106 may be the opposite of that described.

FIGS. 13–15 of the drawings show still another embodiment of the invention in which the same principle of construction and operation is embodied in a hand tool which may be used as a ratchet wrench or as a drive member. The hand tool includes a pair of elongated handles 110 and 111 joined by a pivot pin 112 disposed within an elongated slot 113 to permit longitudinal movement of the handles 110 and 111 with respect to each other.

The enlarged end 114 of the handle 111 carries an oval opening 115, with opposed inner and outer sets of teeth 116 and 117 respectively which are constructed and arranged in the same manner previously described herein. The enlarged end 118 of the other handle 110 carries a rotatable wheel 119, connected to which are a pair of drive members 120 which extend outwardly from opposite sides of the wrench.

A coil spring 121 is connected between the handles 110 and 111. The upper end 114 is provided with a slot 122 to accomodate the spring 121.

When the handle 111 is moved toward the handle 110, the teeth of the wheel 119 will cam into engagement with the set of teeth 117, causing rotation of the wheel 119 and drive members 120 in a counter-clockwise direction.

Upon release of the handle 111, the spring 121 will cause the handle 111 to move downwardly away from the handle 110. The wheel 119 will then cam into engagement with the opposite set of teeth 116 for further counter-clockwise rotation. The slot 113 permits longitudinal movement of the handle members 110 and 111 with respect to each other to permit shifting of the wheel 119 between the inner and outer sets of teeth 116 and 117.

The drive members 120 may be used to drive or they may be connected to a socket for use of the tool as a wrench. When used as a wrench, the tool is an improvement over a conventional socket wrench because it drives in both directions of movement of the handle.

I claim:

1. A driving mechanism comprising a rotatably mounted wheel, said wheel having a plurality of teeth extending around its periphery, an actuator having a first set of complementary teeth disposed on one side of said wheel and a second set of complementary teeth directed oppositely from said first set and disposed on the opposite side of said wheel, each of said teeth of said wheel and actuator having a radially directed drive face and an angularly directed cam face, the drive faces of said sets of teeth on said actuator being adapted to selectively engage the drive faces of the teeth on said wheel to cause rotational movement of said wheel in a single direction in response to longitudinal movement of said actuator in either direction with respect to said wheel, said teeth being constructed and arranged so that when the teeth on one side of said wheel are fully engaged with one set of teeth of said actuator, the teeth on the opposite side of said wheel barely clear the set of teeth on the opposite side of said actuator, whereby upon reversal of the direction of longitudinal movement of said actuator with respect to said wheel at any longitudinal position of said actuator with respect to said wheel, the cam faces of said teeth automatically engage to provide camming movement of the engaged set of teeth of said actuator out of engagement with the teeth of said wheel and movement of the unengaged set of teeth of said actuator into engagement with the teeth of said wheel, said cam faces also automatically acting upon rotational movement of said wheel in the driven direction other than by movement of said actuator to move said wheel into simultaneous locking engagement with the teeth on both sides of said actuator to prevent further rotational movement of said wheel in the driven direction.

2. The structure described in claim 1, said actuator having an enlarged area disposed at at least one end of said sets of teeth, said enlarged area being of sufficient size so that when said wheel enters said enlarged area, the teeth of said wheel move out of engagement with either set of teeth of said actuator and said wheel and actuator are automatically disengaged from each other.

* * * * *